May 5, 1931. M. SORENSON 1,804,236
AUTOMATIC CRANK PIN OILER
Filed Jan. 27, 1930
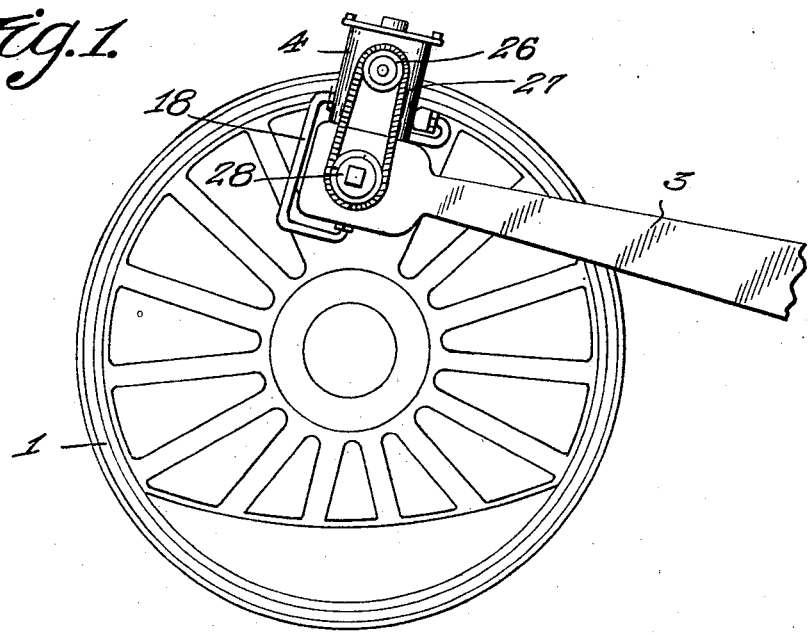
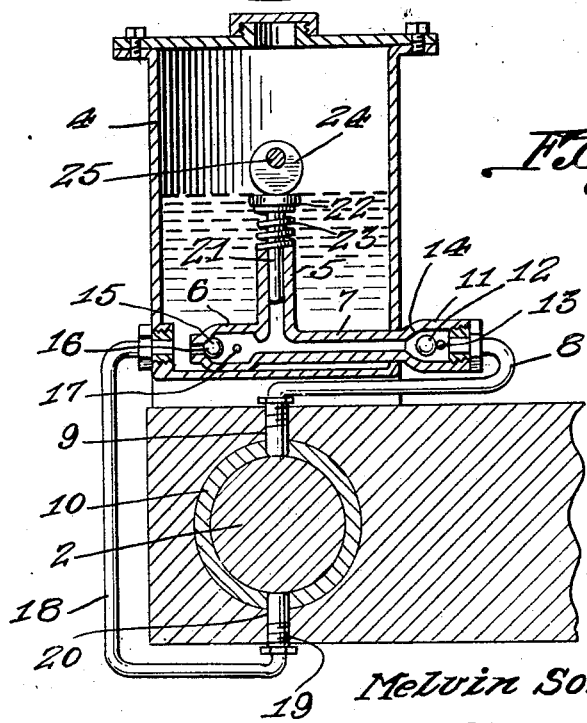
Melvin Sorenson, INVENTOR
BY Victor J. Evans ATTORNEY
WITNESS Patented May 5, 1931

1,804,236

UNITED STATES PATENT OFFICE

MELVIN SORENSON, OF REYNOLDS, NORTH DAKOTA

AUTOMATIC CRANK PIN OILER

Application filed January 27, 1930. Serial No. 423,849.

My present invention has reference to a means for automatically and intermittently lubricating the crank pin of a locomotive drive wheel or the like.

My object is to arrange on the connecting rod of a locomotive drive wheel or the like a lubricant receptacle having a pump therein which is operated by the reciprocatory movement of the connecting rod and which will operate to force oil onto the crank pin and the bearing therefor and to return a surplus of such lubricant into the receptacle, the operation being automatic and continuous.

To the attainment of the foregoing the invention consists in the improvement hereinafter described and definitely claimed.

In the drawings:

Figure 1 is a side elevation of an engine drive wheel provided with the improvement.

Figure 2 is a substantially central longitudinal sectional view through the improvement in applied position.

Referring to Figure 1 the numeral 1 designates the drive wheel for a locomotive or the like, 2 the crank pin to which the connecting rod 3 is pivoted.

Secured on the upper face of the connecting rod 3, directly above the crank pin 2 there is a lubricant receptacle 4. The receptacle is provided with a closed top that has an inlet opening which is normally closed by a cap.

In the lubricant receptacle 4 there is arranged an inverted substantially T-shaped pipe member whose vertical branch is indicated by the numeral 5 and whose lateral branches are indicated by the numerals 6 and 7, respectively. The branch 7 extends through one side of the receptacle 4 and has its outer end enlarged and has screwed therein a nipple that affords a coupling for the rounded end or branch of a pipe 8 which is directed below the receptacle and has its second end provided with a coupling which is screwed in an opening 9 that communicates with an opening in the bearing 10 for the crank shaft 2. In the enlarged end 11 of the branch 7 there is arranged a ball valve 12 which is limited in its outward movement by a pin 13 and which is designed to engage with a seat 14 in the bore of the said enlarged portion 11 of the branch 7.

The branch 6 is also enlarged and has a reduced outlet opening whose wall affords a seat 15 for a ball valve 16. The ball valve is limited in unseated position by contact with the pin 17. In a line with the branch 6 the receptacle 4 has connected thereto a pipe member 18 that has its lower and angle end connected to a coupling 19 that is screwed in an opening 20 that communicates with the bottom of the bearing 10 and the pin 2.

Arranged for longitudinal movement in the vertical branch 5 of the inverted T-shaped member there is a plunger 21. The plunger has its outer end headed, as at 22, and between the branch 5 and the head 22 there is arranged a spring 23 which normally forces the plunger outwardly through the branch 5. The head 22 is engaged by a wheel 24 that has fixed thereon an eccentrically arranged shaft 25. This shaft extends through one side of the receptacle 4 and has fixed thereon a sprocket or like wheel 26 around which is trained a sprocket chain or belt 27 which is also trained around a sprocket or belt wheel 28 that is fixedly secured on the projecting end of the crank pin 2. The construction and operation of the improvement will, it is thought, be apparent to those skilled in the art to which such invention relates. The reciprocation of the connecting rod 3 will cause the wheel 28 to turn, and obviously the turning of this wheel will impart a like turning to the cam wheel 24 which causes a depression of the plunger 21 and an outward movement of the said plunger under the influence of the spring 23 as the cam wheel travels thereover. The downward movement of the plunger will cause the oil in the receptacle 4 to open the valve 12 and to close the valve 16, so that the lubricant will be forced through the pipe 8 onto the pin 2. As the cam wheel turns further to permit of the spring 23 moving the plunger outwardly through the branch 5 the lubricant received around the pin 2 will find an outlet through the pipe 18 and this lubricant as well as the lubricant in the receptacle 4 will again enter the branch 6 of the pump.

The lubricating operation is continuous as long as the wheel 1 turns.

While I have herein set forth a simple and satisfactory embodiment of my invention as the same now appears to me it is to be understood that I do not wish to be limited to the precise details herein set forth and, therefore, hold myself entitled to make such changes therefrom as fairly fall within the scope of what I claim.

Having described the invention, I claim:

A means for lubricating the crank pin of a locomotive or the like, in which said pin is journaled in a connecting rod, said means comprising a lubricant receptacle which is fixed on the connecting rod, an inverted substantially T-shaped pipe member in the receptacle, a spring influenced plunger in the vertical branch of the pipe member, a cam engaging the plunger and having a shaft, a wheel on the outer end of the shaft, a wheel on the outer end of the crank pin, an endless element trained around the wheels, one of the longitudinal branches of the said pipe member extending to one side of the receptacle and being enlarged to provide a seat for a ball valve, a pin for limiting the unseating of the valve, a pipe connection between said branch and the top of the connecting rod and communicating with the crank pin, the second branch of the pipe member having its end affording a seat for a ball valve, a pin for limiting the unseating of the valve and a pipe member connected with the receptacle and with the lower portion of the connecting rod and communicating with the crank pin.

In testimony whereof I affix my signature.

MELVIN SORENSON.